(12) United States Patent
Kottenstette et al.

(10) Patent No.: US 7,780,223 B2
(45) Date of Patent: Aug. 24, 2010

(54) AERODYNAMICALLY ACTIVATED FRONT SKIRT FOR A VEHICLE

(75) Inventors: Ryan J. Kottenstette, Stanford, CA (US); Lora A. Oehlberg, Los Altos, CA (US); Dana M. Ung, San Diego, CA (US); Chuen Chou, Stanford, CA (US); Corina T. Yen, Stanford, CA (US)

(73) Assignee: Bayerische Motoren Werke Aktiengesellschaft (DE)

( * ) Notice: Subject to any disclaimer, the term of this patent is extended or adjusted under 35 U.S.C. 154(b) by 416 days.

(21) Appl. No.: 11/889,208

(22) Filed: Aug. 9, 2007

(65) Prior Publication Data

US 2009/0295190 A1    Dec. 3, 2009

(51) Int. Cl.
B62D 35/02    (2006.01)

(52) U.S. Cl. .................... 296/180.1; 180/903

(58) Field of Classification Search .............. 105/1.1, 105/1.2, 1.3; 180/903; 293/15, 34, 58; 296/180.1, 296/180.5
See application file for complete search history.

(56) References Cited

U.S. PATENT DOCUMENTS

| | | | | |
|---|---|---|---|---|
| 3,618,998 A | * | 11/1971 | Swauger ................ | 296/180.5 |
| 4,131,308 A | * | 12/1978 | Holka et al. ............ | 296/180.5 |
| 4,460,213 A | * | 7/1984 | Janssen et al. .......... | 296/180.5 |
| 4,659,130 A | * | 4/1987 | Dimora et al. .......... | 296/180.1 |
| 4,671,171 A | * | 6/1987 | Brill ........................ | 454/2 |
| 4,758,037 A | * | 7/1988 | Suzuki et al. ........... | 296/180.1 |
| 4,778,212 A | * | 10/1988 | Tomforde ................ | 296/180.1 |
| 4,951,994 A | * | 8/1990 | Miwa ...................... | 296/180.1 |
| 4,976,489 A | * | 12/1990 | Lovelace ................. | 296/180.1 |
| 5,419,608 A | * | 5/1995 | Takemoto ............... | 296/180.1 |
| 5,458,391 A | * | 10/1995 | Ito et al. .................. | 296/180.1 |
| 6,033,010 A | * | 3/2000 | Preiss ...................... | 296/180.1 |
| 6,079,769 A | * | 6/2000 | Fannin et al. ........... | 296/180.1 |
| 6,719,359 B2 | * | 4/2004 | Steinicke et al. ........ | 296/180.1 |
| 6,886,883 B2 | * | 5/2005 | Jacquemard et al. ... | 296/180.5 |
| 2004/0155485 A1 | * | 8/2004 | Hamnett .................. | 296/180.1 |
| 2005/0121946 A1 | * | 6/2005 | McKnight et al. ...... | 296/180.1 |
| 2007/0063541 A1 | * | 3/2007 | Browne et al. .......... | 296/180.1 |

FOREIGN PATENT DOCUMENTS

| | | | |
|---|---|---|---|
| DE | 3145257 A1 | * | 5/1983 |
| DE | 3630645 A1 | * | 3/1988 |

(Continued)

*Primary Examiner*—Glenn Dayoan
*Assistant Examiner*—Paul A Chenevert
(74) *Attorney, Agent, or Firm*—Timothy J. Klima; Shuttleworth & Ingersoll, PLC (57) ABSTRACT

An active front skirt for a vehicle includes an airfoil positioned in an air stream existing when the vehicle is moving forward. An airfoil positioning mechanism attached to the vehicle and the airfoil allows the airfoil to move between a first position when the vehicle is at rest and a second position when the vehicle has attained an upper limit velocity, the airfoil being moved to the second position through interaction with the air stream. A retracting mechanism returns the airfoil to the first position. A movable front skirt connected to the airfoil correspondingly moves with the airfoil between raised and lowered positions. In the raised position, ground clearance of the skirt is increased. In the lowered position, the skirt deflects an increased portion of the air stream to lower aerodynamic drag on the vehicle.

26 Claims, 3 Drawing Sheets

FOREIGN PATENT DOCUMENTS

| | | | | |
|---|---|---|---|---|
| DE | 3712048 | A1 | * | 10/1988 |
| EP | 1090831 | A2 | * | 4/2001 |
| EP | 1582444 | A2 | * | 10/2005 |
| FR | 2538767 | A1 | * | 7/1984 |
| FR | 2575126 | A1 | * | 6/1986 |
| FR | 2626544 | A1 | * | 8/1989 |
| GB | 2017023 | A | * | 9/1979 |
| GB | 2051691 | A | * | 1/1981 |
| JP | 57051581 | A | * | 3/1982 |
| JP | 60012378 | A | * | 1/1985 |
| JP | 62085770 | A | * | 4/1987 |
| JP | 62218287 | A | * | 9/1987 |
| JP | 62221977 | A | * | 9/1987 |
| JP | 62221978 | A | * | 9/1987 |
| JP | 01226480 | A | * | 9/1989 |
| JP | 02306886 | A | * | 12/1990 |
| JP | 03090485 | A | * | 4/1991 |
| JP | 05105124 | A | * | 4/1993 |

* cited by examiner

AERODYNAMICALLY ACTIVATED FRONT SKIRT FOR A VEHICLE

BACKGROUND OF THE INVENTION

Many vehicles currently employ a front skirt in front of their tires to improve their aerodynamics. Tires increase drag because when air impacts the front of the rotating tires, the tires give rise to air vortices and introduce a second separation point in the air flow. This drag increases with velocity, and at high speeds the front tires contribute close to 30% of front cross-sectional drag. Benefits of reduced drag include better handling at high speeds, improved fuel efficiency and hence, reduced emissions.

The front skirt used on certain BMW® automobiles is a plastic, rectangular flap suspended from the bumper, extending approximately 90 mm down in front of the tire. The skirt redirects some of the air away from the tire, reducing the drag. Ideally, the skirt would extend far enough to keep all or most air from impacting the tire, but the skirt length is limited for two main reasons. First, by being closer to the ground, the skirt runs into obstacles such as speed bumps, curbs, potholes, and parking blocks. Second, the skirt detracts from the visual aesthetic of the design. These factors are most problematic at slow speeds, when vehicles are most likely to encounter parking blocks and speed bumps, and while stopped, when the skirt's detraction from vehicle aesthetics is most noticeable. The current design addresses these issues by keeping the skirt length short (thus not realizing the full potential to reduce drag) and making it out of flexible material that can bend when it hits an obstacle.

DESCRIPTION OF THE RELATED ART

U.S. Pat. No. 4,131,308, "Self-Deploying Chin Spoiler For A Vehicle," discloses a chin spoiler of relatively plain configuration pivotally mounted at a rear portion thereof to the vehicle. The chin spoiler pivots from a raised to a lowered position by wind-force only acting directly on the flap as vehicle speed increases. European Patent No. (EP) 1090831A2 "Device Used In Areas In Bottom Of Motor Vehicle Where There Are Openings For Air Cooling And Conditioning Or Brake Cooling, For Example", is similar to U.S. Pat. No. 4,131,308, and discloses a plain flap which can pivot downward from a rear pivot mounting through wind-force only acting directly on the flap. These patents both disclose deployable spoilers which are self operated by wind force only. German Patent No. (DE) 102004016105A1, also found in European Patent No. (EP) 1582444A2, discloses a similar operating mechanism utilized as a rear spoiler and having a pivoting flap mounted on the rear top side of the vehicle which is activated by wind-force only acting directly on the flap. It has the same limitations as discussed previously in this paragraph.

U.S. Pat. No. 4,778,212, "Motor Vehicle Front Bumper Molding With Air Spoiler" discloses actuatable flaps in front of the wheels which can be lowered by an external power source, such as an electrical, mechanical or servo-fluid actuated device. Such external power source creates additional power demand on the vehicle, as well as adding complexity and weight, due to the actuators. U.S. Pat. No. 4,671,171, "Aerodynamically Operated Rain Cap," is of general interest only and discloses a cover over an air exhaust pipe that uses a wing shape, pivot, and weight to control the position of the cover.

BRIEF SUMMARY OF THE INVENTION

To summarize, the present invention is an active front skirt for a vehicle and includes an airfoil positioned in an air stream existing when the vehicle is moving forward. An airfoil positioning mechanism attached to the vehicle and the airfoil allows the airfoil to move between a first position when the vehicle is at rest and a second position when the vehicle has attained an upper limit velocity, the airfoil being moved to the second position through interaction with the air stream. A retracting mechanism returns the airfoil to the first position. A movable front skirt connected to the airfoil correspondingly moves with the airfoil between raised and lowered positions. In the raised position, ground clearance of the skirt is increased to avoid street obstacles and maintain the car's visual aesthetic. In the lowered position, the skirt deflects an increased portion of the air stream to lower aerodynamic drag on the vehicle, provide maximum aerodynamic benefit, increase fuel efficiency and decrease emissions.

BRIEF DESCRIPTION OF THE SEVERAL VIEWS OF THE DRAWINGS

The invention will now be described in more detail in light of the accompanying figures, where like reference numbers indicate like components.

DETAILED DESCRIPTION OF THE INVENTION

Figure 1:
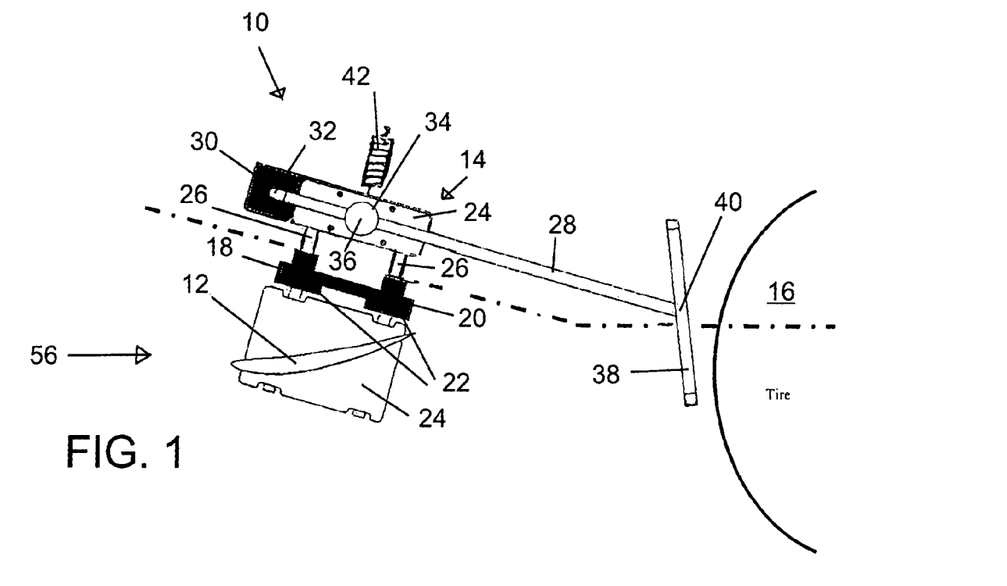
FIG. 1 shows an elevational view of the active front skirt of the present invention installed on a vehicle (partly shown), where the front skirt is in a raised position.
Figure 2:
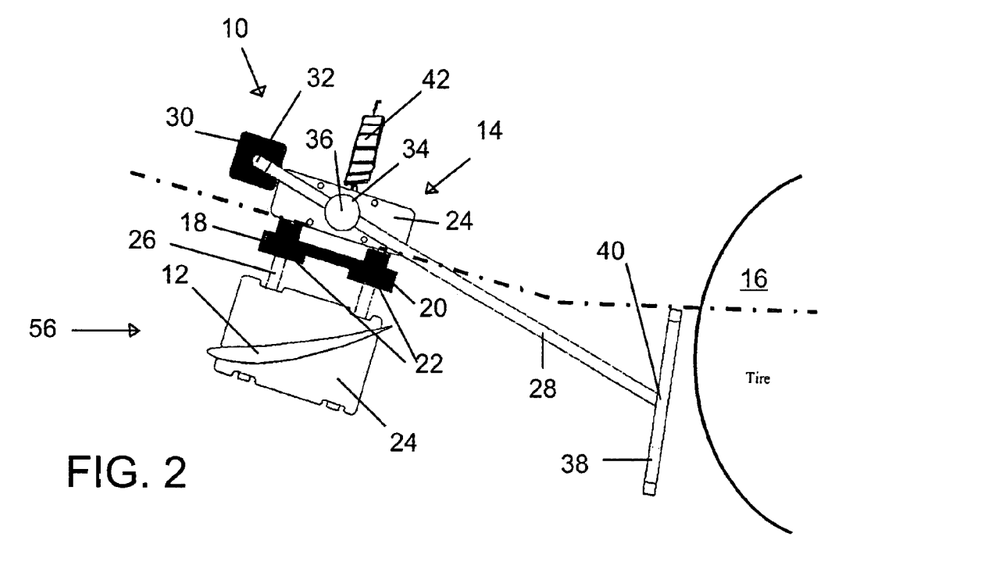
FIG. 2 shows an elevational view of the active front skirt of FIG. 1, where the front skirt is in a lowered position.

An active front skirt for a vehicle is generally shown at 10 in the FIGS., wherein FIG. 1 shows a movable front skirt in a raised position and FIG. 2 shows the movable front skirt in the lowered position. The active front skirt 10 includes an airfoil 12 attached to an airfoil positioning system 14. The airfoil positioning system 14 is attached to the vehicle 16 and includes a pair of positioning units 18 positioned on opposite sides of the vehicle 16.

Figure 3:
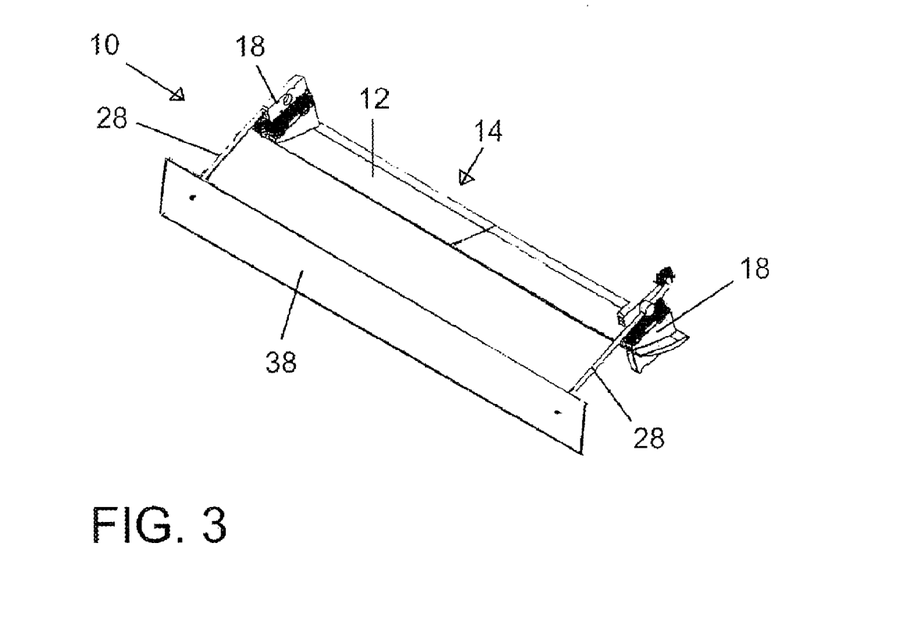
FIG. 3 shows a perspective view of the active front skirt of FIG. 1.

Each positioning unit 18 includes a fixed base 20 attached to the vehicle 16. The fixed base 20 has a pair of linear bearings 22, which may be of a movable roller type or of a plain bushing type. A movable carriage 24 includes a pair of elongated members 26 for engaging the respective linear bearings 22 and allowing linear movement between the elongated members 26 and the linear bearings 22, and thus, linear movement between the movable carriage 24 and the fixed base 20. In the embodiment shown, the elongated members 26 and linear bearings 22 are circular in cross-section, although they can also have different cross-sectional shapes and configurations. Opposite ends of the airfoil 12 are attached to respective movable carriages 24 to allow the airfoil to move up and down within a range of movement along the path provided by the linear bearings/elongated members. In a preferred embodiment, the airfoil 12 has an elongated wing profile and is positioned generally horizontally at an underside of the vehicle 16. See FIG. 3. In a preferred embodiment, the airfoil positioning mechanism 14 maintains the airfoil 12 at a generally same angle of attack with the air stream 56 as the airfoil 12 moves between limits of travel. See FIGS. 1 and 2. In an alternative embodiment, the airfoil 12 can be solidly mounted between opposite side pivoting arms 28, without use of the fixed bases or movable carriages. In such an embodiment, the angle of attack of the airfoil would vary as the pivoting arms 28 pivot in reaction to the air stream 56 and retracting mechanism forces.

The use of a known wing profile as the airfoil 12 provides known aerodynamic characteristics and maximizes the aerodynamic efficiency of the active front skirt 10 while providing sufficient power from the air stream 56 only to actuate the movable front skirt 38 (see below) without use of external actuators that draw power from the vehicle and add weight and complexity to the vehicle, thereby offsetting the savings from reducing aerodynamic drag. In one preferred embodiment, a NACA 6049 wing profile was utilized at an angle of attack of between 10-15°. This is an efficient thin profile wing with a high coefficient of lift at the given angle of attack. Ideally, the airfoil 12 is positioned to engage a cleaner, less turbulent portion of the air stream to maximize efficiency.

A pivoting arm 28 is pivotably attached to the vehicle 16 at with a pivot bearing 30 at a first engagement position 32. The movable carriage 24 includes a sliding pivot bearing 34 for attaching the movable carriage 24 (and thus the airfoil 12) to the pivoting arm 28 at a second engagement position 36 distal from the first engagement position 32. In the embodiment shown, the movable carriage 24 moves in a straight line while the pivoting arm 28 moves in an arc. Therefore, the connection between the movable carriage 24 and the pivoting arm 28 is a sliding pivot bearing 34 that allows for both pivoting of the pivoting arm 28 with respect to the movable carriage 24 and sliding of the pivoting arm 28 in the sliding pivot bearing 34, such that the second engagement position can move along the pivoting arm within a given range.

A movable front skirt 38 is attached to the pivoting arm 28 at a third engagement position 40, thereby connecting the movable front skirt 38 to the airfoil 12. In this embodiment, the attachment between the movable front skirt 38 and the pivoting arm 28 is a movable one. In other embodiments, as discussed below for example, the attachment can be a flexible or pivoting attachment. The movable front skirt 38 is shown as a simple panel in the figures but in actual practice, the movable front skirt can be configured to have any shape found to provide the desired strength, aerodynamic, aesthetic, manufacturing (and other) characteristics.

The first engagement position 32, second engagement position 36 and third engagement position 40 are arranged on the pivoting arm 28 to create a mechanical advantage between the airfoil 12 and the movable front skirt 38 such that a distance between a raised position and a lowered position of the movable front skirt 38 is greater than a distance between a raised first position and a lowered second position of the airfoil 12. This mechanical advantage provides a full range of motion for the movable front skirt 38 from a smaller range of motion for the airfoil 12. This reduces clearance issues with respect to the vehicle 16 and ground for the airfoil 12 and airfoil positioning mechanism 14 and allows for a more compact airfoil positioning mechanism 14. The mechanical advantage is preferably $\geq 2:1$ and in a preferred embodiment, the mechanical advantage is approximately 5:1. Other alternative arrangements of the first second and third engagement positions with respect to the pivoting arm, movable carriage and movable front skirt can also be used to best adapt the system to the constraints of a given vehicle 16.

A retracting mechanism 42 is attached between the vehicle 16 and the movable carriage 24/airfoil 12 to provide a retracting force to the airfoil 12. In the embodiment shown, the retracting mechanism is an extension spring, but other types of springs, such as leaf springs or torsion bars can also be used, as well as other types of mechanisms that can provide a retracting force (e.g., hydraulic or pneumatic cylinders, electric motors, etc.).

The active front skirt 10 operates as follows. The airfoil 12 is positioned to be in an air stream 56 existing when the vehicle is moving forward. In the embodiment shown, this is an air stream 56 beneath the vehicle and towards the front of the vehicle. Alternative air streams and positioning can be used. The airfoil positioning mechanism 14 attached to both the vehicle 16 and to the airfoil 12 allows the airfoil 12 to move between a first position when the vehicle 16 is stationary and a second position when the vehicle 16 has attained an upper limit velocity, the airfoil 12 being moved to the second position through interaction with the air stream 56.

When the vehicle is stationary, there is no air stream from movement of the vehicle and thus, there is no force acting on the air foil 12 from an air stream, only the retracting force acting on the airfoil 12 from the retracting mechanism 42. At such point, the airfoil 12 and movable front skirt 38 are fully retracted (raised) by the force of the retracting mechanism 42, thereby maximizing ground clearance of the airfoil 12/movable front skirt 38. As the vehicle 16 accelerates forward to create an air stream 56 in which the airfoil is positioned, the force acting on the airfoil 12 from the air stream 56 will correspondingly increase as the velocity of the vehicle, and respectively, velocity of the air stream 56, increases. This air stream force counteracts the force of the retracting mechanism 42 and as the velocity increases, the air stream force acting on the airfoil 12 correspondingly increases to progressively move the airfoil 12 (and correspondingly, the movable front skirt 38 via the pivoting bar 28 and movable carriage 24) downwardly against the force of the retracting mechanism. In the embodiment shown, use of an extension spring provides a generally linear retracting force (force/distance). Other retracting mechanisms can be provided with alternative force/distance characteristics.

At a certain velocity, designated the upper limit velocity, the force acting on the airfoil from the air stream 56 will have counteracted the force acting on the airfoil 12 from the retracting mechanism to an extant that the airfoil 12 will have moved to its full (extension) limit of travel, at which point neither it nor the movable front skirt 38 can lower any further. At this point, the movable front skirt 38 is at its lowest design limit, thereby providing the maximum air deflection and lowest aerodynamic drag. It should be noted that the upper limit velocity is just a designation with respect to travel of the airfoil 12 and is not related to a velocity capability of the vehicle. In a preferred embodiment, the upper limit velocity is designed/selected to be approximately 70-80 km/h, inclusive, and any point or range therein. Therefore, at approximately 70-80 km/h, the movable front skirt 38 of such an embodiment will have just completely deployed (lowered). Other upper limit velocities can also be used as circumstances dictate.

Figure 5:
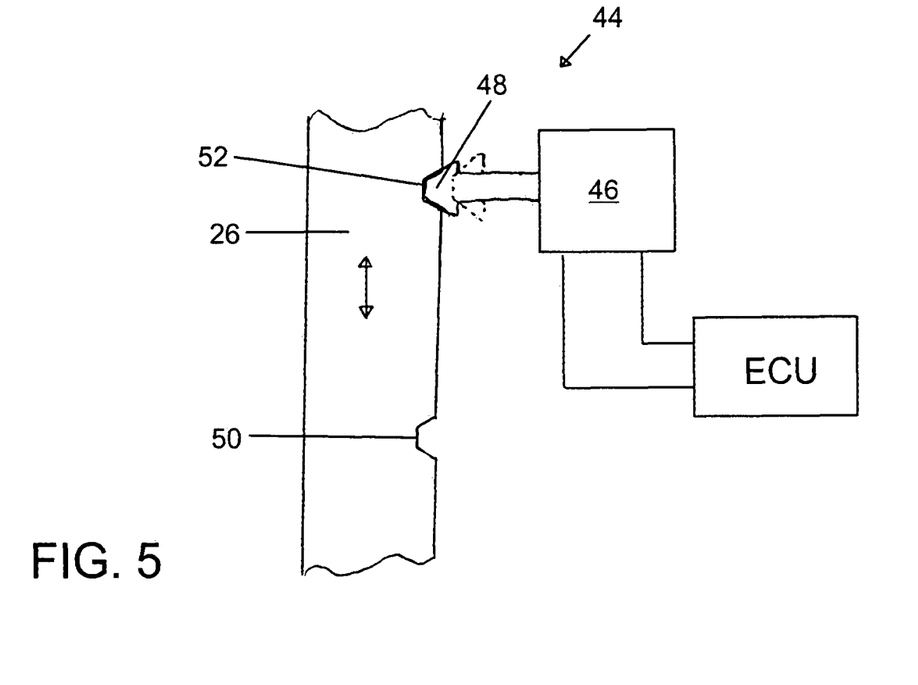
FIG. 5 shows a partial schematic view of a selectively engageable stop mechanism for use with the active front skirt of the present invention.

In an alternative embodiment, the active front skirt 10 includes a selectively engageable stop mechanism 44 for fixing the movable front skirt 38 in a desired position. See FIG. 5. The selectively engageable stop mechanism 44 includes an actuator 46 (in a preferred embodiment, a solenoid or other type of actuator) having a selectively retractable/extendible plunger 48. The actuator 46 is connected to an electronic control unit (ECU) by which vehicle operating parameters can be determined and actuator operating instructions can be made. The ECU includes, or receives vehicle velocity data from, a vehicle velocity measuring device.

The plunger 48 can be selectively extended to engage one of the detents 50 and 52 positioned in one of the elongated members 26. When the plunger 48 is extended to engage one of the detents 50 or 52, neither the airfoil 12 nor the movable front skirt 38 can move, as the plunger 48 has locked the elongated member 26 in place. When the plunger 48 is retracted (see phantom lines, FIG. 5) it is raised free of the elongated member 26 to allow the elongated member 26, air foil 12 and movable front skirt 38 to move respectively, depending on the forces acting thereon.

In a preferred embodiment, it is desirable to maintain the movable front skirt 38 in a raised position at low vehicle velocities, because at such low velocities, the movable front skirt 38 has little effect on vehicle drag and it is at such lower velocities that the vehicle 16 is more likely to require an increased ground clearance for traversing curbs, speed bumps, potholes, etc. At a certain velocity, which will be designated the lower limit velocity (and which is below the upper limit velocity discussed above) the positive effect of lowering the movable front skirt 38 has increased and/or the negative effects from reduced ground clearance have decreased, such that it is desirable to lower the movable front skirt 38.

Without the selectively engageable stop mechanism 44, the movable front skirt 38 will begin to lower as soon as the velocity has increased such that the air stream force on the air foil 12 has overcome the preload force of the retracting mechanism. With the selectively engageable stop mechanism 44, the movable front skirt 38 is fixed in the raised position by controlling the actuator 46 with the ECU to have the plunger 48 extend into detent 50 of elongated member 26 until the vehicle 16 has accelerated to the lower limit velocity. At the lower limit velocity, the actuator 46 is controlled by the ECU to disengage (retract) the plunger 48 from the detent 50 to allow movement of the elongated member 26, air foil 12 and the movable front skirt 38. In a preferred embodiment, the lower limit velocity is approximately 60 km/h, although this figure can be altered as circumstances dictate. The operating parameters of the system (spring rate, preload, wing profile, angle of attack, etc,) can be adjusted so that substantive deployment of the movable front skirt will not occur until approximately the designated lower limit velocity As velocity increases past the lower limit velocity, the air stream force on the air foil 12 will correspondingly increase and correspondingly lower the movable front skirt 38 until the movable front skirt 38 reaches its maximum extension or limit of travel, and can move downward no further. At this upper limit velocity, or even at a velocity above the upper limit velocity, the actuator 46 is controlled by the ECU to engage the plunger 48 with the detent 52 to lock the elongated member 26, air foil 12 and the movable front skirt 38 in the fully lowered position. In a preferred embodiment, the selectively engageable stop mechanism 44 maintains this locked lowered position until the vehicle 16 has decelerated from the upper limit velocity (or higher) to the lower limit velocity, whereupon the actuator 46 is controlled by the ECU to disengage (retract) the plunger 48 from the detent 52 to again allow movement of the elongated member 26, air foil 12 and the movable front skirt 38. By providing a range between the upper limit velocity and lower limit velocity, a "fluttering" of the movable front skirt 38 is prevented as compared to a system where a single velocity is used to determine locking/unlocking of the movable front skirt, and the vehicle is traveling in a range around such single velocity.

Figure 6:
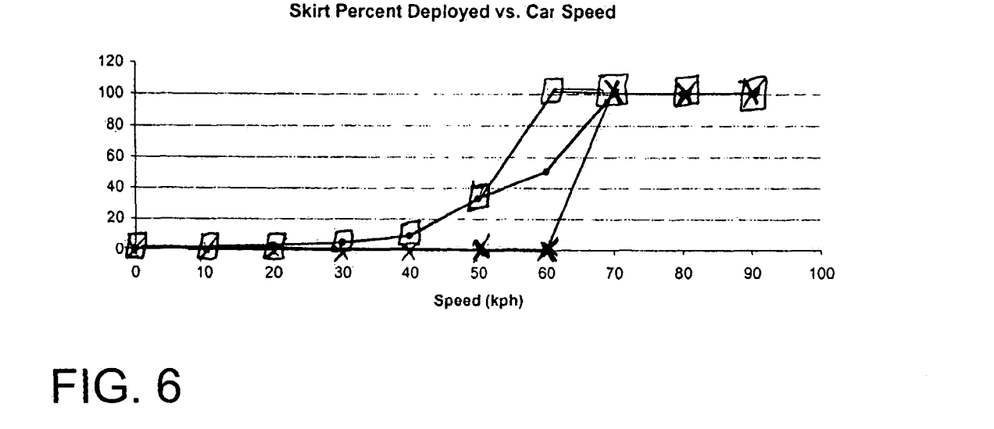
FIG. 6 is a chart showing percent deployment of movable front skirt of the present invention under different circumstances.

FIG. 6 is a chart showing measured percent deployment of the movable front skirt of one prototype of the present invention under different circumstances. The first curve, using dots as the indicators, shows deployment of the movable front skirt without use of the selectively engageable stop mechanism 44. The movable front skirt moves only slightly between 0-40 km/h, then moves to full deployment between 40-70 km/h, whereupon maximum deployment has been attained. The second curve, using "x"s as the indicators, shows deployment of the movable front skirt with use of the selectively engageable stop mechanism 44, as velocity increases from 0 to 90 km/h. The movable front skirt 38 is locked in the raised (non-employed) position and doesn't move between 0-60 km/h. At this point, the selectively engageable stop mechanism 44 is disengaged to allow movement of the movable front skirt 38, which then moves to full deployment between 60-70 km/h, whereupon maximum deployment has been attained. The selectively engageable stop mechanism 44 locks the movable front skirt in the lowered (fully deployed) position at some point at or above 70 km/h.

The third curve, using hollow squares as the indicators, shows deployment of the movable front skirt with use of the selectively engageable stop mechanism 44, as velocity decreases from 90 to 0 km/h, where the selectively engageable stop mechanism has already locked the front skirt in the lowered (fully deployed) position, as discussed above with the second curve. The movable front skirt 38 is locked in the lowered (fully employed) position and doesn't move between 90-60 km/h. At 60 km/h, the selectively engageable stop mechanism 44 is disengaged to allow movement of the movable front skirt 38, which then retracts between 60-0 km/h, whereupon maximum retraction has been attained and the selectively engageable stop mechanism 44 can again be used to lock the movable front skirt 38 in the raised (non-employed) position.

These curves were created based on measurements from a prototype. Ideally, as discussed above, the operating parameters of the system would be adjusted such that all substantive movement of the movable front skirt 38 is between the specified lower and upper limit velocities, with the movable front skirt locked when below the lower limit velocity and above the upper limit velocity, while being completely self powered by the airfoil 12 and retracting mechanism 42 to move to the upper and lower locking positions.

Though not preferred, an auxiliary actuator can also be used with the active front skirt 10, when using the selectively engageable stop mechanism 44, to actively move the movable front skirt 38 to a locking position independently of the retracting mechanism and air stream forces. Such actuator can be controlled by the ECU.

Figure 4:
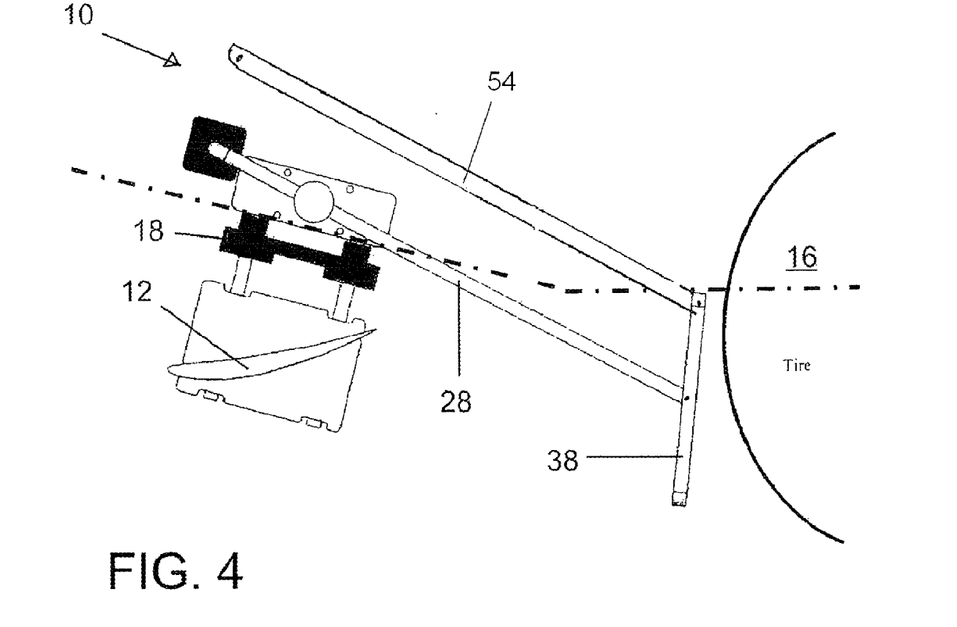
FIG. 4 shows an elevational view of an alternative embodiment of the active front skirt of FIG. 1.

In an alternative embodiment shown in FIG. 4, one or both of the positioning units 18 includes an auxiliary pivoting arm 54 arranged in parallel (or not) with the pivoting arm 28 and pivotably connected between the vehicle 16 and the movable front skirt 38 (at a different elevation on the movable front skirt 38 than the pivoting arm 28) to provide additional stability to the movable front skirt 38, as well as to maintain a given attitude of the movable front skirt 38 throughout its range of travel, or if a non-parallel arrangement is used, a given range of attitude of the movable front skirt 38 throughout its range of travel. A single auxiliary pivoting arm 54 can also be used whether incorporated with one of the positioning units or separate therefrom. In such alternative embodiments, the connection between the movable front skirt 38 and the pivoting arm 28 would also be a pivoting connection.

The components can be made of known materials, including metals, plastics and composites. A conductive metallic layer can be placed on the components, and especially the airfoil 12, to allow for resistive heating to combat ice under freezing conditions. Sprayers can be utilized to clean the airfoil 12. The active front skirt 10 can be disabled in a retracted position under certain winter or other conditions (off-road use, for example) where snow, ice, mud, rocks, the terrain, etc. could damage the mechanism. Shields, seals and flexible gaiters or bellows can be employed to protect bearing surfaces.

Various aspects of the various embodiments can be combined in different combinations to create new embodiments.

LIST OF REFERENCE NUMBERS 10 active front skirt
12 airfoil
14 airfoil positioning mechanism
16 vehicle
18 positioning unit
20 fixed base
22 linear bearing
24 movable carriage
26 elongated member
28 pivoting arm
30 pivot bearing
32 first engagement position
34 sliding pivot bearing
36 second engagement position
38 movable front skirt
40 third engagement position
42 retracting mechanism
44 selectively engageable stop mechanism
46 actuator
48 plunger
50 detent, lower limit velocity
52 detent, upper limit velocity
54 auxiliary pivoting arm
56 air stream

What is claimed is:

1. An active front skirt for a vehicle, comprising:
an airfoil positioned in an air stream existing when the vehicle is moving forward;
an airfoil positioning mechanism attached to the vehicle and to the airfoil, the airfoil positioning mechanism allowing the airfoil to move between a first position when the vehicle is stationary and a second position when the vehicle has attained an upper limit velocity, the airfoil being moved to the second position through interaction with the air stream;
a movable front skirt connected to the airfoil to correspondingly move with the airfoil between a raised position and a lowered position, wherein, in the raised position, a ground clearance of the front skirt is increased and in the lowered position, the front skirt deflects an increased portion of the air stream to lower an aerodynamic drag on the vehicle;
a pivoting arm attached between the airfoil and the movable front skirt to pivotably connect the movable front skirt with respect to the airfoil.

2. An active front skirt as in claim 1, wherein the first position of the airfoil is raised and the second position is lowered.

3. An active front skirt as in claim 1, wherein the airfoil positioning mechanism maintains the airfoil at a generally same angle of attack with the air stream as the airfoil moves between the first and second positions.

4. An active front skirt as in claim 1, and further comprising:
a retracting mechanism connected to the airfoil for returning the airfoil to the first position when the vehicle has slowed below the upper limit velocity, wherein the retracting mechanism is a spring.

5. An active front skirt as in claim 1, wherein the airfoil positioning mechanism includes a fixed base attached to the vehicle and a movable carriage attached to the airfoil and a pivoting arm, the movable carriage movably attached to the fixed base to allow a range of movement of the movable carriage.

6. An active front skirt as in claim 5, wherein the fixed base includes at least one linear bearing and the movable carriage includes at least one elongated member for engaging the linear bearing and allowing linear movement between the elongated member and the linear bearing, and thus, linear movement between the movable carriage and the fixed base.

7. An active front skirt as in claim 1, and further comprising a selectively engageable stop mechanism for engaging one of the moving components to selectively fix the movable front skirt in the raised position when the vehicle is at rest and to also selectively fix the movable front skirt in the lowered position when the vehicle has reached the upper limit velocity.

8. An active front skirt as in claim 7, wherein the selectively engageable stop mechanism fixes the movable front skirt in the raised position until the vehicle has accelerated to a lower limit velocity less than the upper limit velocity, whereupon the selectively engageable stop mechanism disengages the respective moving component to allow movement of the movable front skirt; the selectively engageable stop mechanism also fixing the movable front skirt in the lowered position until the vehicle has decelerated from the upper limit velocity to the lower limit velocity, whereupon the selectively engageable stop mechanism disengages the respective moving component to allow movement of the movable front skirt.

9. An active front skirt as in claim 1, wherein the pivoting arm is pivotably attached to the vehicle at a first engagement position, and also connected to the airfoil at a second engagement position and to the movable front skirt at a third engagement position, thereby connecting the movable front skirt to the airfoil.

10. An active front skirt as in claim 9, wherein the airfoil has an elongated wing profile and is positioned generally horizontally at an underside of the vehicle and is attached to the movable front skirt with two pivoting arms attached between opposite ends of the airfoil and movable front skirt.

11. An active front skirt as in claim 9, and further comprising an auxiliary pivoting arm pivotably connected between the vehicle and the movable front skirt, at a different elevation on the movable front skirt than the pivoting arm, to provide additional stability to the movable front skirt and maintain a given range of attitude of the movable front skirt throughout a range of travel of the movable front skirt.

12. An active front skirt as in claim 9, wherein the first, second and third engagement positions are arranged on the pivoting arm to create a mechanical advantage between the airfoil and the movable front skirt such that a distance between the raised position and the lowered position of the movable front skirt is greater than a distance between the first position and the second position of the airfoil.

13. An active front skirt as in claim 12, and further comprising:
a retracting mechanism connected to the airfoil for returning the airfoil to the first position when the vehicle has slowed below the upper limit velocity, wherein the retracting mechanism is a spring.

14. An active front skirt as in claim 12, wherein the mechanical advantage is 2:1.

15. An active front skirt as in claim 14, wherein the mechanical advantage is approximately 5:1.

16. An active front skirt as in claim 12, wherein the airfoil positioning mechanism includes a fixed base attached to the vehicle and a movable carriage attached to the airfoil and the pivoting arm, the movable carriage movable attached to the fixed base to allow a range of movement of the movable carriage.

17. An active front skirt as in claim 16, wherein the fixed base includes at least one linear bearing and the movable carriage includes at least one elongated member for engaging the linear bearing and allowing linear movement between the elongated member and the linear bearing, and thus, linear movement between the movable carriage and the fixed base.

18. An active front skirt as in claim 17, and further comprising a sliding connector connecting the airfoil to the pivoting arm such that the second engagement position can move along the pivoting arm within a given range.

19. An active front skirt as in claim 17, and further comprising a selectively engageable stop mechanism for engaging one of the moving components to selectively fix the movable front skirt in the raised position when the vehicle is at rest and to also selectively fix the movable front skirt in the lowered position when the vehicle has reached or exceeded the upper limit velocity.

20. An active front skirt as in claim 19, wherein the selectively engageable stop mechanism fixes the movable front skirt in the raised position until the vehicle has accelerated to a lower limit velocity less than the upper limit velocity, whereupon the selectively engageable stop mechanism disengages the respective moving component to allow movement of the movable front skirt; the selectively engageable stop mechanism also fixing the movable front skirt in the lowered position until the vehicle has decelerated to the lower limit velocity, whereupon the selectively engageable stop mechanism disengages the respective moving component to allow movement of the movable front skirt.

21. An active front skirt as in claim 20, wherein the selectively engageable stop mechanism is electrically controlled with respect to a signal from a vehicle velocity measuring device.

22. An active front skirt as in claim 21, wherein the lower limit velocity is approximately 60 km/h and the upper limit velocity is approximately 80 km/h.

23. An active front skirt for a vehicle, comprising:
an airfoil positioned in an air stream existing when the vehicle is moving forward;
an airfoil positioning mechanism attached to the vehicle and to the airfoil, the airfoil positioning mechanism allowing the airfoil to move between a first position when the vehicle is stationary and a second position when the vehicle has attained an upper limit velocity, the airfoil being moved to the second position through interaction with the air stream;
a movable front skirt connected to the airfoil to correspondingly move with the airfoil between a raised position and a lowered position, wherein, in the raised position, a ground clearance of the front skirt is increased and in the lowered position, the front skirt deflects an increased portion of the air stream to lower an aerodynamic drag on the vehicle;
wherein the airfoil positioning mechanism includes a fixed base attached to the vehicle and a movable carriage attached to the airfoil and a pivoting arm, the movable carriage movable attached to the fixed base to allow a range of movement of the movable carriage;
wherein the fixed base includes at least one linear bearing and the movable carriage includes at least one elongated member for engaging the linear bearing and allowing linear movement between the elongated member and the linear bearing, and thus, linear movement between the movable carriage and the fixed base.

24. An active front skirt for a vehicle, comprising:
an airfoil positioned in an air stream existing when the vehicle is moving forward;
an airfoil positioning mechanism attached to the vehicle and to the airfoil, the airfoil positioning mechanism allowing the airfoil to move between a first position when the vehicle is stationary and a second position when the vehicle has attained an upper limit velocity, the airfoil being moved to the second position through interaction with the air stream;
a movable front skirt connected to the airfoil to correspondingly move with the airfoil between a raised position and a lowered position, wherein, in the raised position, a ground clearance of the front skirt is increased and in the lowered position, the front skirt deflects an increased portion of the air stream to lower an aerodynamic drag on the vehicle;
a selectively engageable stop mechanism for engaging one of the moving components to selectively fix the movable front skirt in the raised position when the vehicle is at rest and to also selectively fix the movable front skirt in the lowered position when the vehicle has reached the upper limit velocity.

25. An active front skirt as in claim 24, wherein the selectively engageable stop mechanism fixes the movable front skirt in the raised position until the vehicle has accelerated to a lower limit velocity less than the upper limit velocity, whereupon the selectively engageable stop mechanism disengages the respective moving component to allow movement of the movable front skirt; the selectively engageable stop mechanism also fixing the movable front skirt in the lowered position until the vehicle has decelerated from the upper limit velocity to the lower limit velocity, whereupon the selectively engageable stop mechanism disengages the respective moving component to allow movement of the movable front skirt.

26. An active front skirt for a vehicle, comprising:
an airfoil positioned in an air stream existing when the vehicle is moving forward;
an airfoil positioning mechanism attached to the vehicle and to the airfoil, the airfoil positioning mechanism allowing the airfoil to move between a first position when the vehicle is stationary and a second position when the vehicle has attained an upper limit velocity, the airfoil being moved to the second position through interaction with the air stream;
a movable front skirt connected to the airfoil to correspondingly move with the airfoil between a raised position and a lowered position, wherein, in the raised position, a ground clearance of the front skirt is increased and in the lowered position, the front skirt deflects an increased portion of the air stream to lower an aerodynamic drag on the vehicle;

a pivoting arm pivotably connected between the vehicle and the movable front skirt;

an auxiliary pivoting arm pivotably connected between the vehicle and the movable front skirt, at a different elevation on the movable front skirt than the pivoting arm, to provide additional stability to the movable front skirt and maintain a given range of attitude of the movable front skirt throughout a range of travel of the movable front skirt.

* * * * *